(12) United States Patent
Akimov et al.

(10) Patent No.: US 8,255,767 B2
(45) Date of Patent: Aug. 28, 2012

(54) METHOD, SYSTEM, AND COMPUTER PROGRAM PRODUCT FOR TRANSMISSION OF BIT SENSITIVE INFORMATION

(75) Inventors: Oleg N. Akimov, Niedersachsen (DE); Thorsten D. Roessel, Niedersachsen (DE); Jiang Li, Katy, TX (US)

(73) Assignee: Baker Hughes Incorporated, Houston, TX (US)

( * ) Notice: Subject to any disclaimer, the term of this patent is extended or adjusted under 35 U.S.C. 154(b) by 1243 days.

(21) Appl. No.: 12/024,524

(22) Filed: Feb. 1, 2008

(65) Prior Publication Data

US 2009/0199072 A1 Aug. 6, 2009

(51) Int. Cl.
*H03M 13/00* (2006.01)

(52) U.S. Cl. .............. 714/758; 714/748; 714/18

(58) Field of Classification Search ........... 714/758, 714/748, 18
See application file for complete search history.

(56) References Cited

U.S. PATENT DOCUMENTS

| | | | |
|---|---|---|---|
| 5,419,405 A * | 5/1995 | Patton | 175/27 |
| 5,671,136 A * | 9/1997 | Willhoit, Jr. | 702/18 |
| 6,580,751 B1 | 6/2003 | Gardner et al. | |
| 7,042,367 B2 | 5/2006 | Gardner et al. | |
| 7,230,541 B2 | 6/2007 | Ripolone et al. | |
| 2004/0156264 A1 | 8/2004 | Gardner et al. | |

OTHER PUBLICATIONS

P.L. Higginson, et al. "On the computation of cyclic redundancy checks by program". The Computer Journal. vol. 16, No. 1. pp. 19-22. Mar. 1972.

P.E. Boudreau, et al. "Cyclic redundancy checking by program". Fall Joint Computer Conference-AFIPS Proceedings, vol. 39. 1971. pp. 9-15.

Notification Concerning Transmittal of International Preliminary Report on Patentability (IPRP) and Written Opinion; PCT/US2009/032620; Mailed Aug. 12, 2010.

* cited by examiner

*Primary Examiner* — Fritz Alphonse
(74) *Attorney, Agent, or Firm* — Cantor Colburn LLP

(57) ABSTRACT

A method for communication between a geologic downhole measurement device and a receiver is provided. The method includes: receiving a bit sensitive data stream representing at least one property of at least one of a geologic formation and a borehole; grouping the data stream into at least one data block; and coding the data block with a forward error correction code. A system and computer program product for communication between a geologic downhole measurement device and a receiver are also provided.

20 Claims, 6 Drawing Sheets

40

| DATA - 42 | CRC - 44 | SYNC - 46 | CHECK SYMBOLS - 48 |

METHOD, SYSTEM, AND COMPUTER PROGRAM PRODUCT FOR TRANSMISSION OF BIT SENSITIVE INFORMATION

BACKGROUND

Various formation evaluation tools and other suitable devices, typically integrated into a bottomhole assembly, are used in hydrocarbon exploration and production to measure properties of geologic formations during or shortly after the excavation of a borehole. Communications techniques such as Mud Pulse Telemetry (MPT) and other telemetery techniques are used to transmit formation evaluation (FE) data to the surface while drilling or reaming, in conjuction with various logging processes. Since data rates of current telemetry techniques are low, and downhole measurements in some cases (e.g., imaging services) may require transmission of large arrays of data with bit sensitive information, downhole data compression may be needed. There are some compression techniques algorithms to compress data sets downhole and decompress the data sets on the surface, which may only work properly when the bit stream received on the surface is identical with the bit stream produced downhole.

For some communication techniques, and particularly for telemetry techniques, the quality of communication channels may vary along the channels, and thus communication quality cannot be completely relied on.

In typical telemetry processes, primarily due to varying communication quality, errors are commonly introduced into the compressed data during transmission. Errors may come from various sources, such as pump noise, signal attenuation and signal reflection. Data sets which are compressed by bit sensitive compression techniques could be damaged or completely destroyed if an error occurs at the beginning of the corresponding bit stream.

SUMMARY

Disclosed herein is a method for communication between a geologic downhole measurement device and a receiver. The method includes: receiving a bit sensitive data stream representing at least one property of at least one of a geologic formation and a borehole; grouping the data stream into at least one data block; and coding the data block with a forward error correction code.

Also disclosed herein is a system for communication between a geologic downhole measurement device and a receiver. The system includes: a compression processor for compressing a bit sensitive data stream representing at least one property of at least one of a geologic formation and a borehole; a coding processor for grouping the data stream into at least one data block and coding the data block with a forward error correction code; and a transmitter for transmitting the coded data block to a receiver.

Further disclosed herein is a computer program product comprising machine readable instructions stored on machine readable media. The instructions are for communication between a geologic downhole measurement device and a receiver by implementing a method including: receiving a bit sensitive data stream representing at least one property of at least one of a geologic formation and a borehole; grouping the data stream into at least one data block; and coding the data block with a forward error correction code.

BRIEF DESCRIPTION OF THE DRAWINGS

The following descriptions should not be considered limiting in any way. With reference to the accompanying drawings, like elements are numbered alike.

DETAILED DESCRIPTION

There is provided a system and method for processing and/or transmitting arrays of bit sensitive data from a formation evaluation (FE) device to a receiver in real-time while drilling or reaming, such as during logging processes include measurement-while-drilling (MWD) and logging-while-drilling (LWD) processes. In one embodiment, the system and method is used during or after drilling operations in conjunction with communication channels having non-ideal communication quality, e.g., Mud Pulse Telemetry Communication Channels (MPTCC). Generally, the quality and speed provided by communication channels used during drilling, such as the MPTCC, is significantly lower than of wireline communication channels. The system and method allow for correction of errors in the data received by the receiver in real time.

The method combines one or more of synchronization, error correction and error detection techniques. In one embodiment, downhole acquired data is prepared and grouped or divided into at least one data block. The data block is coded with an error correction code, such as a forward error correction code. A Cyclic Redundancy Code (CRC) may also be calculated for the data block, and a synchronization symbol, or "synchrosymbol", may be used to synchronize the data block with other transmitted data blocks. After transmission, the beginning of every data block may be defined, and each data block may be decoded and checked for errors.

A detailed description of one or more embodiments of the disclosed system and method are presented herein by way of exemplification and not limitation with reference to the Figures.

Figure 1:
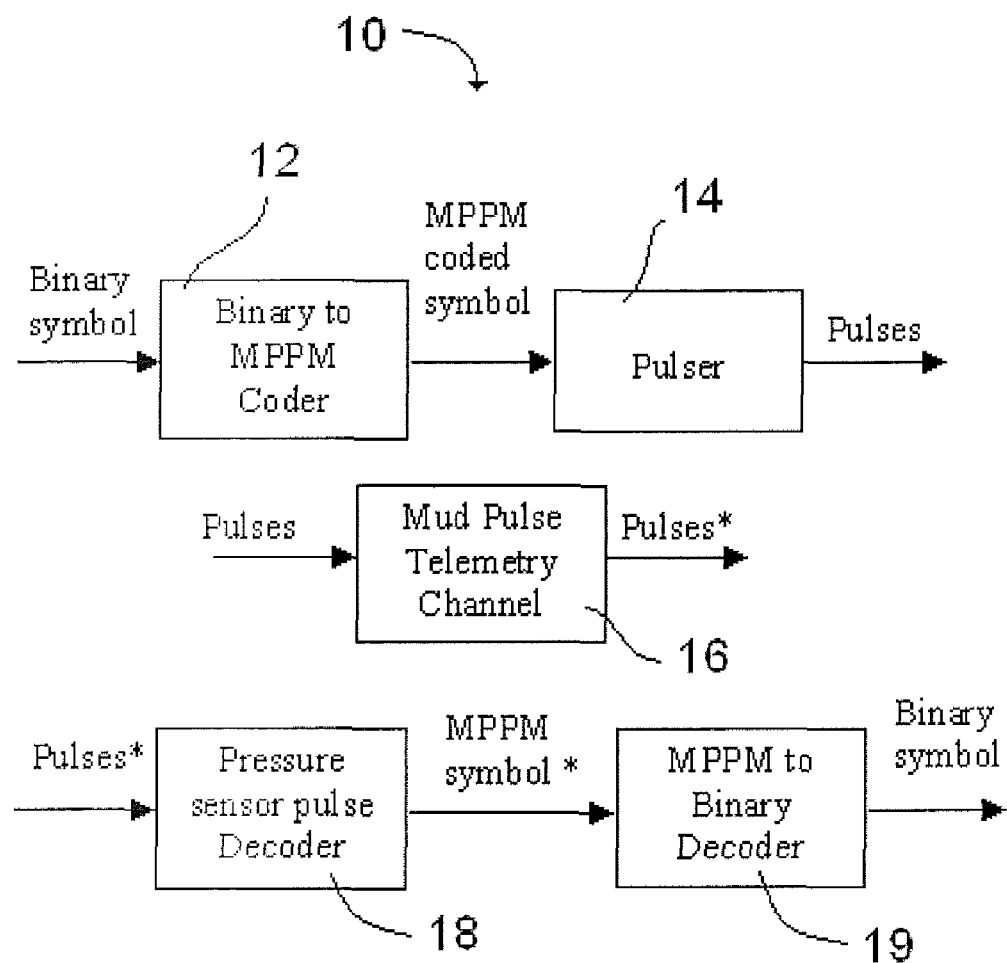
FIG. 1 depicts a block diagram of a Multipole Position Modulation (MPPM) transmission over a Mud Pulse Telemetry communication channel (MPTCC).

Referring to FIG. 1, an example of a Mud Pulse Telemetry (MPT) communication system 10 is illustrated, which incorporates Multipole Position Modulation (MPPM).

Techniques referred to as Multipole Position Modulation (MPPM) may be employed to improve the signal interpretation. MPPM techniques are used to transmit information bits that are summarized in larger entities, such as words. As described herein, a word is any size group of bits that are transmitted together through the MPTCC.

The MPT system 10 includes a binary to MPPM coder 12, a pulser 14, a MPT communications channel (MPTCC) 16, a pressure sensor pulse decoder 18, and a MPPM to binary decoder 19. In this example, the MPT communication system 10 includes MPPM capability. However, this MPPM capability is optional.

In use, a binary symbol or word is transmitted to the binary to MPPM coder 12 which codes the binary symbol to produce an MPPM coded symbol. The MPPM coded symbol includes a binary value of the transmitted symbol that is defined by the pulse position (i.e., time slot of a respective pulse) of the respective symbol. The MPPM coded symbol is transmitted to the pulser 14, which modulates pressure in the drilling fluid, i.e., drilling mud, to produce pulses and thereby transmits data through the MPTCC to a surface processor. The pulses are then received by the decoder 18, which interprets the pulses to reconstruct the MPPM coded symbol. The MPPM coded symbol is then transmitted to the MPPM to binary decoder 19, which decodes the binary symbol. Although the communication channel described herein is a MPTCC, the MPPM coding technique may be applied to any suitable communications channel.

Figure 2:
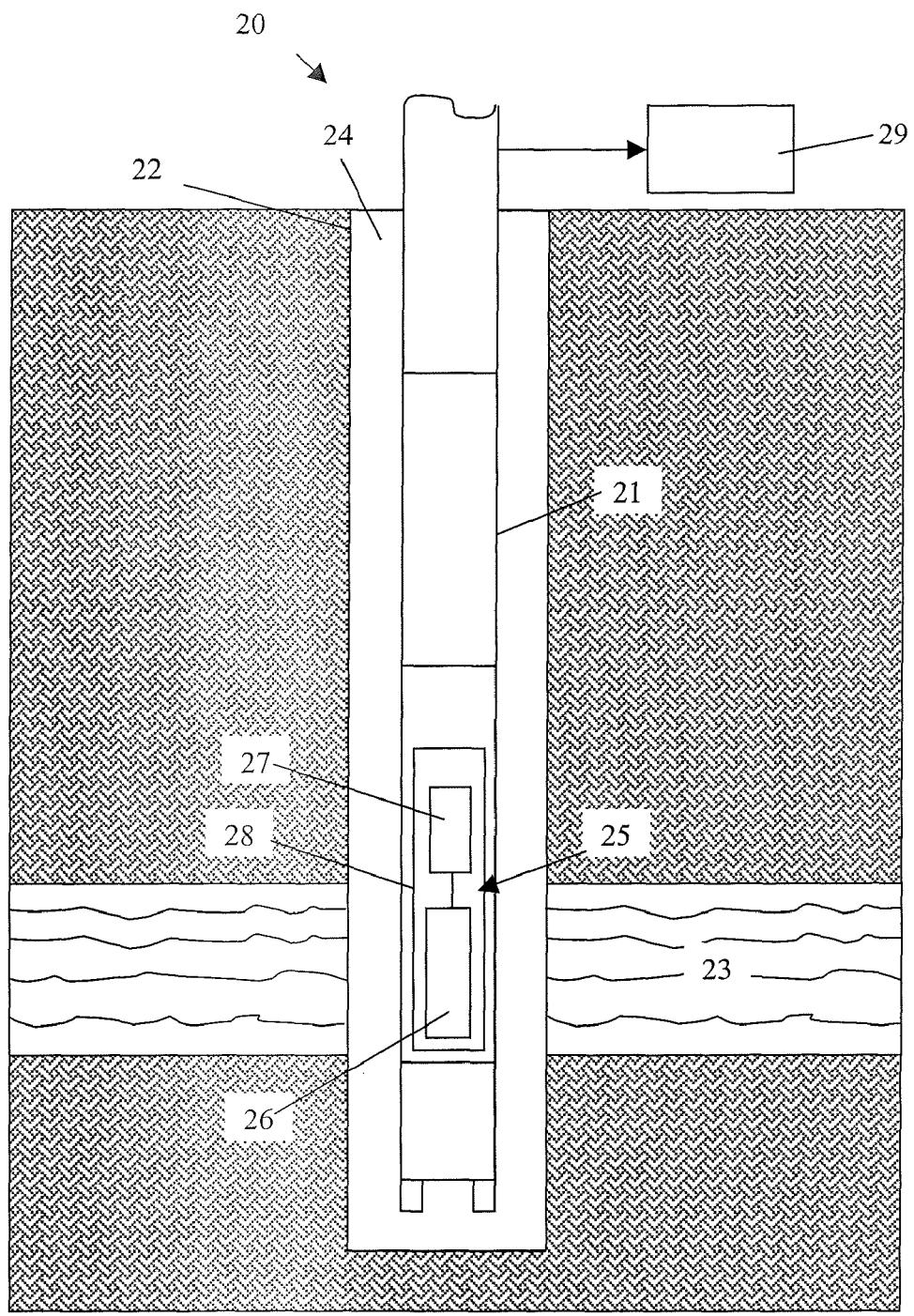
FIG. 2 is an exemplary embodiment of a well logging apparatus.

Referring to FIG. 2, an exemplary embodiment of a well logging apparatus 20 includes a drillstring 21 that is shown disposed in a borehole 22 that penetrates at least one earth formation 23 for making measurements of properties of the formation 23 and/or the borehole 22 downhole. Drilling fluid, or drilling mud 24 may be pumped through the borehole 22. As described herein, formations may refer to the various features and materials that may be encountered in a subsurface environment. Accordingly, it should be considered that while the term formation generally refers to geologic formations of interest, that the term formations, as used herein, may, in some instances, include any geologic points or volumes of interest (such as a survey area).

A downhole tool 25 may be disposed in the well logging apparatus 20 at or near the downhole portion of the drillstring 21, and may form all or part of a bottomhole assembly. The tool 25 may include various sensors or receivers 26 to measure various properties of the formation 23 as the tool 25 is lowered down the borehole 22. Such sensors 26 include, for example, nuclear magnetic resonance (NMR) sensors, resistivity sensors, porosity sensors, gamma ray sensors, seismic receivers and others.

The tool 25 may also include a downhole processor 27 or other device for processing data generated by the sensor 26. The sensor 26 and the downhole processor 27 may be included in a common housing 28. Alternatively, the downhole processor 27 may be remotely located and operably connected to the sensor 26. With respect to the teachings herein, the housing 28 may represent any structure used to support the sensor 26 and/or the downhole processor 27.

The tool 25 may be operably connected to a surface processing unit 29, which may act to control the sensor 26, and may also collect and further process data generated by the sensor 26 and transmitted from the downhole processor 27 during the LWD or MWD process. Both the downhole processor 27 and the surface processing unit 29 may each include components as necessary to provide for processing of data from the tool 25. Exemplary components include, without limitation, at least one processor, storage, memory, input devices, output devices and the like. As these components are known to those skilled in the art, these are not depicted in any detail herein.

The tool 25 may be equipped with transmission equipment to communicate ultimately to the processing unit 29. In one embodiment, transmission is accomplished a via non-ideal communication technique, such as mud pulse telemetry (MPT). In other embodiments, various connections between the tool 25 and the surface processing unit 29 may take any desired form, such as wired, fiber optic or wireless connections.

For example, for MPT communications, the tool 25 may also include or be operably connected to one or more pulsers and/or encoders, such as the pulser 14 and/or the binary to MPPM decoder 12 of FIG. 1. In addition, the surface processing unit 29 may include or be operably connected to one or more decoders, such as the pressure sensor pulse decoder 18 and/or the MPPM to binary decoder 19 of FIG. 1. Such features would enable the tool 25 to communicate with the processing unit 29 using the drilling mud 24 as part of a MPT communications channel.

Although the present embodiment provides the downhole processor 27 and the surface processing unit 29 to both receive and process the data received from the sensor 26, any number or types of processors, circuits or devices for controlling operation of the tool 25 and/or processing of data may be provided. Such devices may include any suitable components, such as storage, memory, input devices, output devices and others.

As used herein, generation of data in real time is taken to mean generation of data at a rate that is useful or adequate for making decisions during or concurrent with processes such as production, experimentation, verification, and other types of surveys or uses as may be opted for by a user or operator. As a non-limiting example, real-time measurements and calculations may provide users with information necessary to make desired adjustments during the drilling process. In one embodiment, adjustments are enabled on a continuous basis (at the rate of drilling), while in another embodiment, adjustments may require periodic cessation of drilling for assessment of data. Such adjustments may also be useful in geosteering applications. Accordingly, it should be recognized that real-time is to be taken in context, and does not necessarily indicate the instantaneous determination of data, or make any other suggestions about the temporal frequency of data collection and determination.

Figure 3:
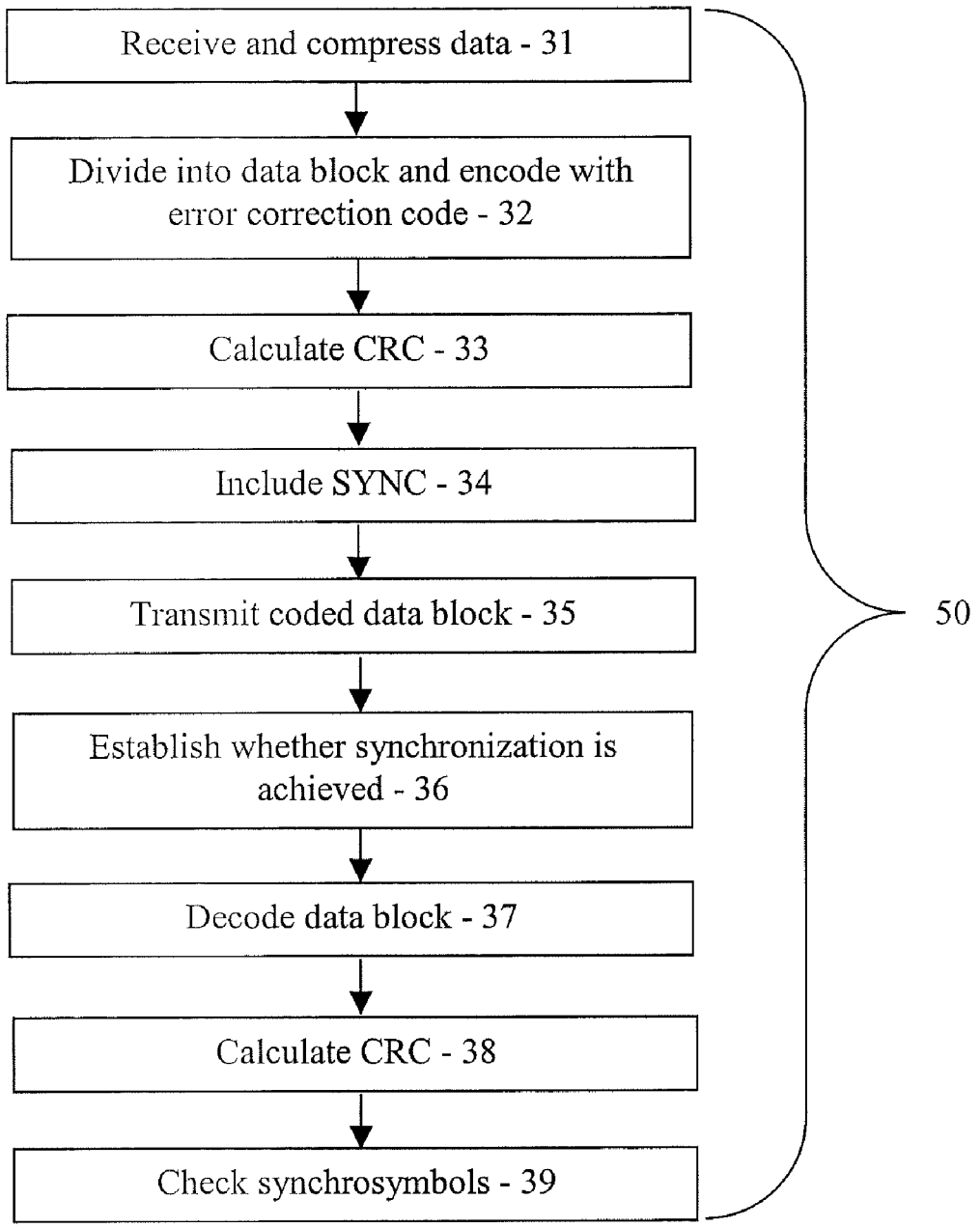
FIG. 3 is a flow chart providing an exemplary method for processing and transmitting data from a downhole tool to a processing unit.

FIG. 3 illustrates a method 30 for coding and transmitting a data block with an error correction code, such as a data block generated by a downhole measurement performed during a LWD or MWD process. The method 30 includes one or more stages 31-39. The method 30 is described herein in conjunction with the processor 27 and the surface processing unit 29, although the method 30 may be performed in conjunction with any number and configuration of processors. In one embodiment, the method includes the execution of all of stages in the order described. However, certain stages may be omitted, stages may be added, or the order of the stages changed.

In the first stage 31, data is received from the sensors and transmitted to the processor. The data is then compressed according to any suitable data compression methods, such as JPEG compression.

In the second stage 32, the data is grouped or divided into one or more data blocks. Each data block is then encoded with an error correction code to produce an encoded block. The correction code may be a symbol correction code or a bit correction code. The data block may include one or more data symbols. As used herein, a symbol refers to a number of bits that are transmitted together during a data transmission. A symbol may include a single bit or multiple bits.

The data may be divided at any time prior to transmission. However, in cases where real time images are transmitted, the set of data which is going to be sent to the surface may not always be divided to data blocks prior to a transmission request. Thus, in one embodiment, the data is divided into data blocks upon receipt of a request for transmission, and the order of transmission of the data blocks is determined upon receipt of the request.

In one embodiment, the error correction code is a forward error correction code. A forward error correction code allows the surface processing unit 29 to detect and correct errors without the need to ask the sending processor, i.e., the processor 27, for additional data. Therefore, the method 30 allows the system 20 to avoid requiring the surface processing unit 29 to send data from the surface to downhole.

In one embodiment, the error correction code is a block code, which is applied to fixed size packets of data, for example, the data blocks described herein. In another embodiment, the error correction code is a shortened Reed-Solomon forward symbol error correction code (RSECC). The RSECC is a forward error correction code, which means that redundant information will be added to the data block to allow for the possibility to check on and to correct for errors.

In encoding data blocks with block codes such as the RSECC, a fixed number of information symbols are utilized to generate a predefined number of check symbols that are added to the information symbols to generate a code word. As described herein, data symbols associated with a coded data block, i.e., a RSECC block, may include both information symbols and check symbols. The number of check symbols defines the maximum number of errors that may be possible to correct after detection. This number may as well define the polynomial which is used in the RSECC to define the presence of a bad symbol, i.e., a symbol containing an error.

In one embodiment, the second stage 32 includes setting the parameters for the RSECC. Such parameters include whether the block is a cyclic block, the number of bits per symbol, the number of symbols per block, the number of check symbols per block, and the number of information symbols per block. The tool 25 may be programmed with selected parameters either prior to drilling (e.g., on the surface) or via downlink while the tool 25 is positioned downhole.

In one embodiment, the RSECC should include an option to switch off use of the RSECC in the case that another high-speed and/or high quality communication channel (e.g., Wired Pipe) will be used, or in the case the channel error correction coding is already implemented in the pulser.

In one embodiment, the RSECC may include the capability to set conditional parameters for the RSECC. For example, certain parameters may be changed during the drilling process and/or as data is transmitted based on the error rate (i.e., the number of errors detected per data block) associated with the data blocks received during the drilling process. For example, the number of bits per symbol and/or the number of check symbols may be lowered if the error rate is significantly lower than anticipated. Such conditional parameters provide an option to improve the net data rate. Also, the fact that the parameters can be changed while the drilling process is ongoing may be especially advantageous in geosteering applications.

In the third stage 33, each data block is encoded with a Cyclic Redundancy Code (CRC) or Cyclic Redundancy Checksum to detect accidental alteration of data during transmission. One property of the RSECC is that if the number of errors in the data block is larger than the maximum number of correctable errors, the decoder could produce the wrong information about successful correction of errors. In such an instance, based on such wrong information, it could be erroneously determined that the data block was properly decoded. To avoid this situation, the CRC is implemented. This CRC may be transmitted as part of the data block, and when check symbols of the RSECC are calculated, the CRC is taken in account as well.

The CRC is calculated based on the data symbols which were sent in that particular block and may be transmitted immediately after the last data symbol is transmitted.

In the fourth stage 34, a synchronization symbol is included with each data block to allow the decoder to properly determine the correct order of the data blocks transmitted. The synchronization symbol may be referred to as a synchrosymbol or "SYNC".

The synchrosymbol may be transmitted after the CRC and could be used for synchronization and for a consequence check. For example, the first block may be assigned a synchrosymbol value of 1, the second block may be assigned the synchrosymbol value of 2, and so on.

In the fifth stage 35, the coded data block, i.e., RSECC block, is transmitted, for example, via MPT. In one example, mud pulses may be decoded using the surface processing unit 29 and any suitable software. The decoded data block is then accessible for further decompression.

In the sixth stage 36, the decoder establishes whether synchronization is achieved by identifying the beginning of every RSECC block. In one embodiment, synchronization is achieved if each of the following three criteria is satisfied: 1) the synchrosymbols of consecutive blocks are consecutive, 2) the CRC for each block does not indicate an error, and 3) the decoder determines that the number of errors is less than or equal to the maximum number of correctable errors.

In completing this stage, information regarding multiple blocks transmitted via MPTCC may be stored as symbols in the surface processing unit 26. For example, the number of symbols equal to two consecutive RSECC blocks may be stored in the buffer. The block immediately following the stored RSECC blocks may be received, and all three blocks may be used by the decoder to attempt to satisfy all three criteria. If any of the criteria is not satisfied, synchronization is assumed to be bad and the next symbol should be put in buffer and the procedure should be repeated.

In the seventh stage 37, a procedure for decoding the RSECC blocks is implemented. In one embodiment, decoding is implemented upon confirmation that the decoder has received the exact number of symbols transmitted for a data block. For example, for (255,223) format coding, the exact number of symbols received should equal 255 symbols including 223 information symbols and 32 check symbols.

If result of this decoding shows that there are more errors than RSECC could correct, there could be indication of a loss of data or synchronization. In such a case, that particular block of information is omitted from the current data flow and may later be re-decoded using various re-decoding techniques.

If the result of this RSECC decoding shows that the number of errors is less than or equal to the maximum number of errors that can be corrected by RSECC, the RSECC decoding routine may continue. The decoding routine may further include utilizing a syndrome code transmitted with the RSECC block to correct detected errors.

In the eighth stage 38, the CRC is calculated, and if the CRC result is wrong, i.e. the calculated remainder is other than zero, than that particular block of information contains an error. The block may then be omitted from the current data flow and may later be re-decoded using various re-decoding techniques.

In the ninth stage 39, if CRC calculation does not result in an error, the synchrosymbols of each consecutive block may be checked. If the synchrosymbols for consecutive blocks are consecutive in value, the method is complete and the block is successfully decoded. If the synchrosymbols are not consecutive, the block may then be omitted from the current data flow and may later be re-decoded using various re-decoding techniques.

The surface processing unit 26 may further include or be operable connected to a display to display status information during any of the stages of the method 30. Examples of status information includes the presence or the absence of synchronization, the number of the symbol in the synchronization buffer, the number of the symbol in the currently received block, information before and after decoding, the result of the CRC calculation, and the synchrosymbol. Based on this information, the current status of the communication may be clearly determined.

Figure 4:
FIG. 4 depicts a block diagram of a Reed-Solomon forward symbol error correction code (RSECC) block.

Referring to FIG. 4, the correction code and optional additional data described above, such as the CRC and SYNC, may be transmitted as part of an RSECC block 40. The RSECC block 40 may consist of one or more of transmitted data 42, CRC 44, SYNC 46 and check symbols 48 for the RSECC. The transmitted data 42 includes the data associated with the data block. The check symbols 48 are provided to, inter alia, define the maximum number of errors that can be corrected after detection.

Figure 5:
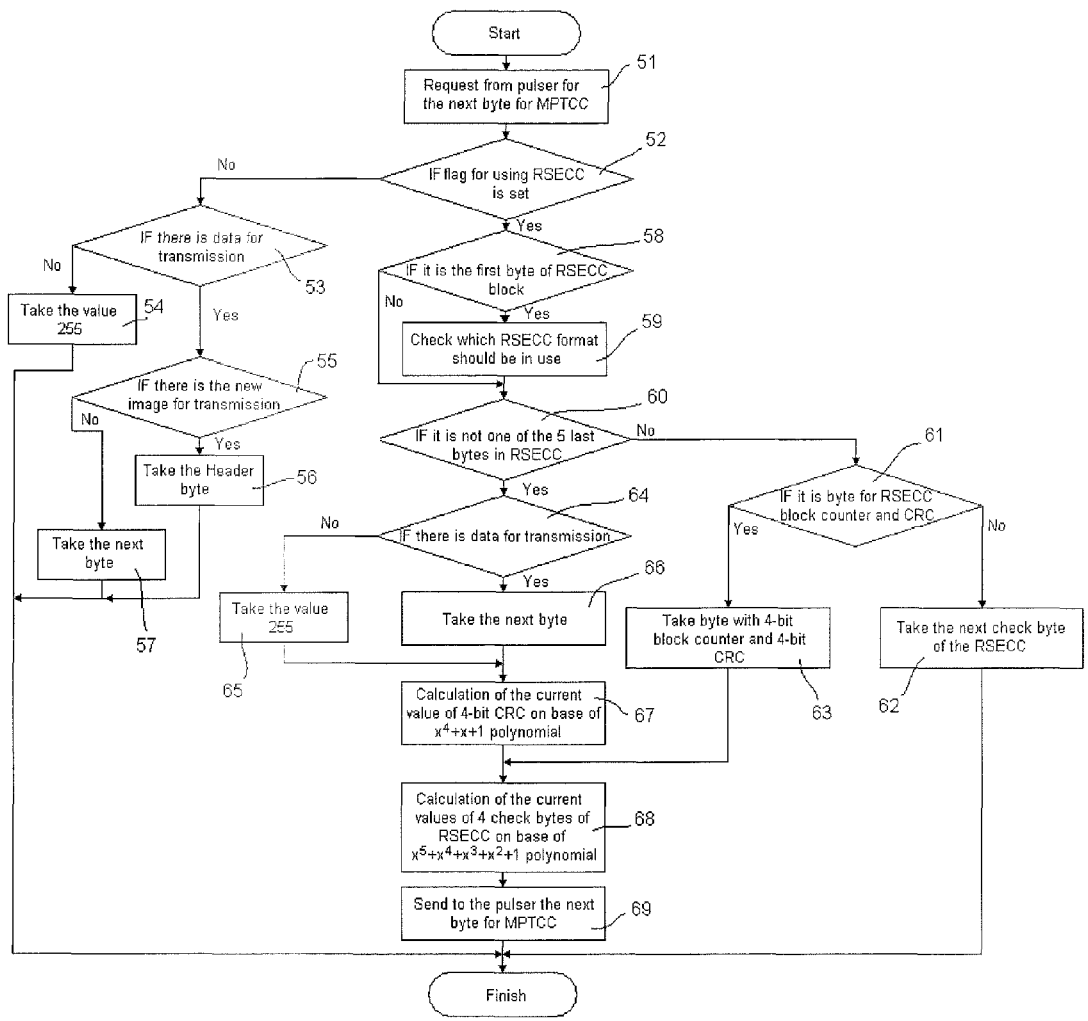
FIG. 5 is a flow chart providing an exemplary method for encoding a data block.

FIG. 5 illustrates an example of a method 50 for RSECC encoding of a byte in a data block generated by a downhole measurement performed during a LWD or MWD process. The method 50 includes one or more stages 51-69. The method 50 is described herein in conjunction with the processor 27, although the method 50 may be performed in conjunction with any number and configuration of processors. In one embodiment, the method includes the execution of all of stages in the order described. However, certain stages may be omitted, stages may be added, or the order of the stages changed.

In stage 51, the processor 27 requests a byte from a data block in the pulser 14 that is to be transmitted via a MPTCC. In this example, the data block includes "N" bytes or data symbols, 1 byte for the CRC and SYNC and 4 bytes for check symbols of RSECC. In stage 52, the processor 27 determines whether a flag is set in the byte to allow for use of the RSECC method.

In stage 53, if the flag is not set for RSECC, the processor 27 determines whether there is data in the byte for transmission. In stage 54, if there is no data for transmission, the byte is returned to the pulser 14 with the value "255".

In stage 55, if there is data for transmission, the processor 27 determines whether the data represents a new image for transmission. In stage 56, if the data does represent a new image, the processor 27 requests the header byte from the data block. In stage 57, if the data does not represent a new image, the byte is returned to the pulser 14 and the next byte is requested.

In stage 58, the processor 27 determines whether the byte is the first byte of the data block. If so, in stage 59, the processor checks from the byte which RSECC format should be used.

In stage 60, the processor 27 determines whether the byte is one of the last 5 bytes in the RSECC. If so, in stage 61, the processor 27 determines whether the byte is provided for a RSECC block counter and a CRC. If not, in stage 62, the next check byte of the RSECC is taken and sent to the pulser 14. In stage 63, if the byte is provided for a block counter and a CRC, the byte is taken with a 4-bit block counter and a 4-bit CRC.

In stage 64, if the byte is not one of the last 5 bytes, the processor 27 determines whether there is data in the byte for transmission. If not, in stage 65, the value of 255 is taken for subsequent CRC and check byte calculations. In stage 66, if there is data for transmission, then the byte is taken for subsequent CRC and check byte calculations.

In stage 67, the byte is used for calculation of a 4-bit CRC based on a $x^4+x+1$ polynomial. In stage 68, the current values of four check bytes of the RSECC are calculated based on a $x^5+x^4+x^3+x^2+x$ polynomial.

In stage 69, encoding of the byte is complete, and the byte along with a 4-bit CRC and four check bytes is sent to the pulser 14.

This coding method 50 is repeated for each byte, resulting in the calculation of the CRC and the check symbols. The data may now be transmitted to the surface processing unit 29 as an RSECC block. The CRC and check symbols may be transmitted as part of the RSECC block or transmitted after the RSECC block.

Figure 6:
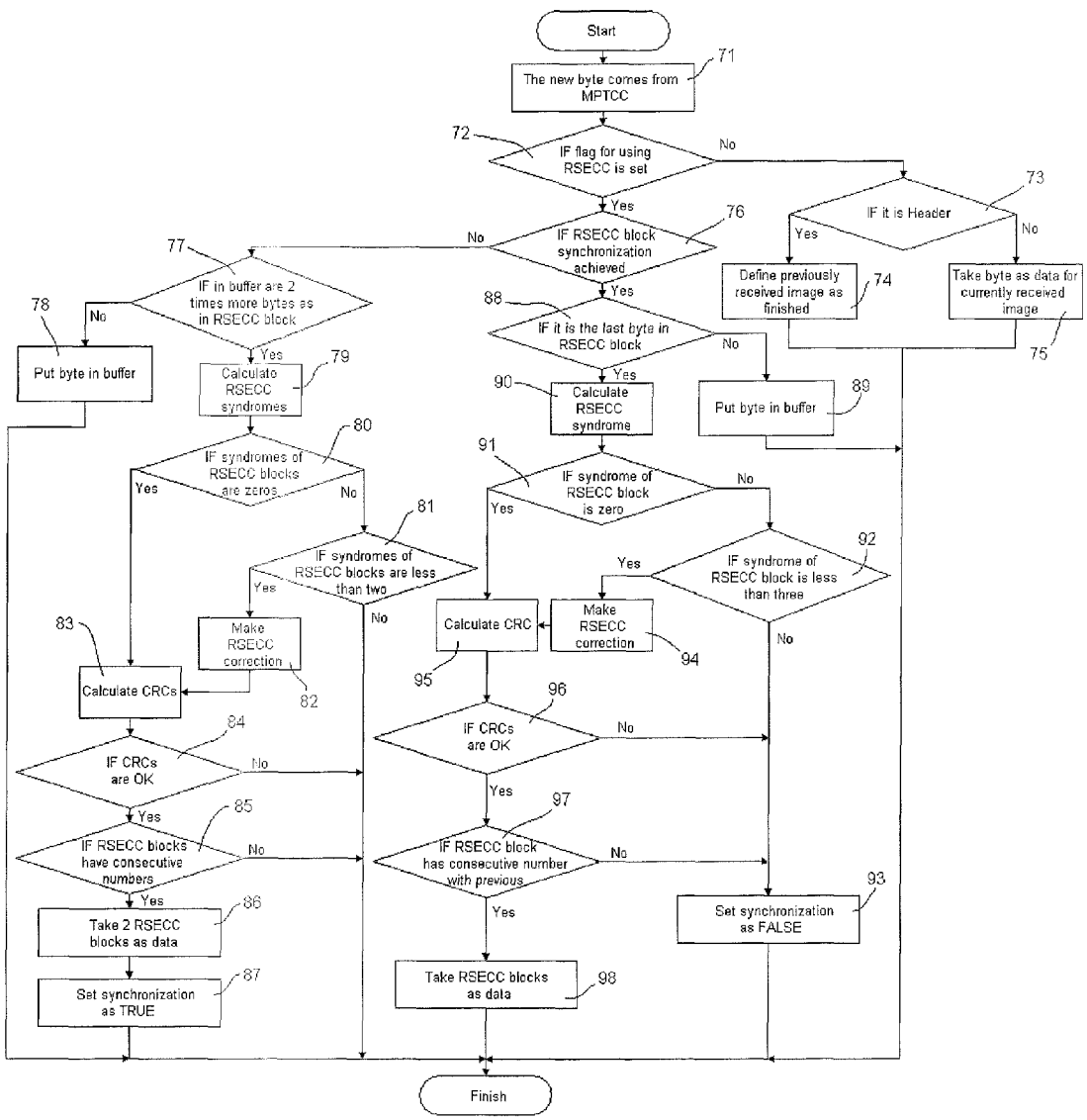
FIG. 6 is a flow chart providing an exemplary method for decoding a data block.

FIG. 6 illustrates an example of a method 70 for decoding and error checking the RSECC block, encoded by the RSECC method of FIG. 5. The method 70 includes one or more stages 71-98. The method 70 is described herein in conjunction with the surface processing unit 29, although the method 70 may be performed in conjunction with any number and configuration of processors. In one embodiment, the method includes the execution of all of stages in the order described. However, certain stages may be omitted, stages may be added, or the order of the stages changed.

In stage 71, a byte is received via the MPTCC. In stage 72, the processing unit 29 determines whether a flag is set in the byte to allow for use of RSECC decoding.

In stage 73, if the flag is not set, the processing unit determines whether the byte is a header. If the byte is a header, in stage 74, the processing unit 29 defines the previously received image as complete. If the byte is not a header, in stage 75, the byte is received as image data.

In stage 76, if the flag is set, the processing unit 29 determines whether RSECC block synchronization is achieved.

If synchronization is not achieved, in stage 77, the processing unit 29 determines whether there are twice as many bytes in the buffer as bytes in the current RSECC block. If not, in stage 78, the byte is stored in the buffer.

In stage 79, if there are sufficient bytes for two RSECC blocks, syndromes are calculated for each RSECC block. In stage 80, it is determined whether the syndromes are zeros. Non-zero values for the syndromes would indicate an error.

In stage 81, if the syndromes are non-zero, it is determined whether the syndrome values are less than two. If not, the errors cannot be corrected. In stage 82, if the syndromes have a value of less than two, RSECC correction is performed.

In stage 83, CRCs are calculated for the RSECC blocks. In stage 84, it is determined whether the CRCs indicate any errors, and in stage 85, it is determined whether the RSECC blocks have consecutive numbers or synchrosymbols. If either the CRCs indicate an error, or the synchrosymbols are non-consecutive, the decoding is unsuccessful and errors are noted. In stages 86 and 87, if the CRCs do not indicate an error and the synchrosymbols are consecutive, the two RSECC blocks are received as data and the synchronization is set as "TRUE".

In stage 88, if RSECC block synchronization is received, the processing unit 29 determines whether the byte is the last byte in the RSECC block. If not, in stage 89, the byte is stored in the buffer. In stage 90, if the byte is the last byte in the RSECC block, i.e., the full RSECC block has been stored in the buffer, a syndrome is calculated for the RSECC block.

In stage 91, the processing unit 29 determines whether the syndrome value is zero. If the syndrome value is zero, no error is detected and the method may proceed to a CRC calculation.

In stage 92, if the syndrome is non-zero, it is determined whether the syndrome value is less than three. In stage 93, if the syndrome value is not less than three, the error cannot be corrected. Synchronization of the RSECC block may be set as FALSE. In stage 94, if the syndrome value is less than three, RSECC correction is performed.

In stage 95, a CRC is calculated for the RSECC block. In stage 96, it is determined whether the CRC indicates any errors, and in stage 97, it is determined whether the RSECC block has a synchrosymbol that is conductive with a previous block. If either the CRC indicates an error, or the synchrosymbols are non-consecutive, the decoding is unsuccessful and errors are noted. In stage 98, if the CRC does not indicate an error and the synchrosymbols are consecutive, the RSECC block is received as data.

The systems and methods described herein provide various advantages over existing processing methods and devices, in that they allow for error checking during transmission of arrays of data during realm time drilling applications using non-ideal communication quality (e.g. Mud Pulse Telemetry). Without these systems and methods, bit sensitive information can only be successfully transmitted for channels having ideal communication quality, such as wireline communications. The systems and methods allow for transmission of arrays of data in real time while drilling or reaming with some redundancy, with the capability to correct errors in the received data in real time. Another advantage of the systems and methods is that they will work even if Multipole Position Modulation (MPPM) techniques are used.

Errors may occur in communications for various reasons. For example, if one bit of the transmitted bit stream in a word is set incorrectly, the entire word may be corrupted. In another example, an error that may occur in MPPM techniques includes providing the wrong definition of time slots in which pulses are located. The error in time slot definition could affect one or several bits of an original binary symbol, simultaneously. The binary symbols decoded by the MPPM to binary decoder 20 may therefore be different than the original binary symbol.

The systems and methods described herein may be applied for any real-time imaging while drilling service. Examples of such services include APLS Elite™ density imaging service, Gamma Elite$^{SM}$ service provided by the OnTrak™ MWD/LWD tool, StarTrak™ resistivity imaging service, TesTrak™ formation pressure measurement service, and any currently used telemetry techniques. The systems and methods are effective and beneficial for imaging tools with high amount of information for transmission and therefore high amount of acquired data.

In support of the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing aspects of the teachings herein. For example, a sample line, sample storage, sample chamber, sample exhaust, pump, piston, power supply (e.g., at least one of a generator, a remote supply and a battery), vacuum supply, pressure supply, refrigeration (i.e., cooling) unit or supply, heating component, motive force (such as a translational force, propulsional force or a rotational force), magnet, electromagnet, sensor, electrode, transmitter, receiver, transceiver, controller, optical unit, electrical unit or electromechanical unit may be included in support of the various aspects discussed herein or in support of other functions beyond this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method for communication between a geologic downhole measurement device and a receiver, the method comprising:
   receiving with the receiver a bit sensitive data stream from the geologic downhole measurement device representing at least one property of at least one of a geologic formation and a borehole;
   grouping, by a coding processor, the data stream into at least one data block; and
   coding, by the coding processor, the data block with a forward error correction code.

2. The method of claim 1, wherein the forward error correction code is a Reed-Solomon forward symbol error correction code (RSECC).

3. The method of claim 1, further comprising calculating a cyclic redundancy code for the data block.

4. The method of claim 1, further comprising calculating a synchronization symbol for the data block.

5. The method of claim 1, further comprising compressing the data stream.

6. The method of claim 1, further comprising transmitting the coded data block to a surface receiver.

7. The method of claim 1, further comprising transmitting the coded data block by a Mud Pule Telemetry (MPT) technique.

8. The method of claim 6, wherein the method is performed in real time during drilling of the borehole.

9. The method of claim 6, further comprising decoding the data block and checking the data block for errors.

10. A system for communication between a geologic downhole measurement device and a receiver, the system comprising:
    a compression processor for compressing a bit sensitive data stream representing at least one property of at least one of a geologic formation and a borehole;

a coding processor for grouping the data stream into at least one data block and coding the data block with a forward error correction code; and a transmitter for transmitting the coded data block to a receiver.

11. The system of claim 10, wherein the forward error correction code is a Reed-Solomon forward symbol error correction code (RSECC).

12. The system of claim 10, wherein the coding processor calculates a cyclic redundancy code for the data block.

13. The system of claim 10, wherein the coding processor calculates a synchronization symbol for the data block.

14. The system of claim 10, wherein the transmitter comprises a pulser for transmitting the coded data block by a Mud Pulse Telemetry (MPT) technique.

15. The system of claim 10, wherein the system is positioned at a downhole portion of a well logging apparatus.

16. A computer program product comprising machine readable instructions stored on machine readable media, the instructions for communication between a geologic downhole measurement device and a receiver, by implementing a method comprising:

receiving a bit sensitive data stream representing at least one property of at least one of a geologic formation and a borehole;

grouping the data stream into at least one data block; and coding the data block with a forward error correction code; and transmitting the coded data block to a receiver via a transmitter.

17. The computer program product of claim 16, wherein the forward error correction code is a Reed-Solomon forward symbol error correction code (RSECC).

18. The computer program product of claim 16, wherein the method further comprises calculating a cyclic redundancy code for the data block.

19. The computer program product of claim 16, wherein the method further comprises calculating a synchronization symbol for the data block.

20. The computer program product of claim 16, wherein the method further comprises transmitting the coded data block by a Mud Pule Telemetry (MPT) technique.

* * * * *